(12) United States Patent
Frolikov

(10) Patent No.: US 11,640,242 B2
(45) Date of Patent: May 2, 2023

(54) NAMESPACE MANAGEMENT IN NON-VOLATILE MEMORY DEVICES

(71) Applicant: Micron Technology, Inc., Boise, ID (US)

(72) Inventor: Alex Frolikov, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 29 days.

(21) Appl. No.: 17/496,666

(22) Filed: Oct. 7, 2021

(65) Prior Publication Data

US 2022/0027054 A1 Jan. 27, 2022

Related U.S. Application Data

(63) Continuation of application No. 16/535,728, filed on Aug. 8, 2019, now Pat. No. 11,157,173, which is a continuation of application No. 15/790,979, filed on Oct. 23, 2017, now Pat. No. 10,503,404.

(51) Int. Cl.
*G06F 3/06* (2006.01)
*G06F 12/02* (2006.01)
*G06F 13/42* (2006.01)

(52) U.S. Cl.
CPC .......... *G06F 3/0608* (2013.01); *G06F 3/0604* (2013.01); *G06F 3/0607* (2013.01); *G06F 3/0631* (2013.01); *G06F 3/0652* (2013.01); *G06F 3/0673* (2013.01); *G06F 3/0688* (2013.01); *G06F 12/0246* (2013.01); *G06F 13/4282* (2013.01); *G06F 2212/7201* (2013.01); *G06F 2213/0026* (2013.01)

(58) Field of Classification Search
CPC ....................................................... G06F 3/06
See application file for complete search history.

(56) References Cited

U.S. PATENT DOCUMENTS

| | | |
|---|---|---|
| 5,430,856 A | 7/1995 | Kinoshita |
| 6,529,921 B1 | 3/2003 | Berkowitz et al. |
| 7,509,473 B2 | 3/2009 | Horn et al. |
| 7,904,636 B2 | 3/2011 | Wu |
| 8,498,417 B1 | 7/2013 | Harwood et al. |

(Continued)

OTHER PUBLICATIONS

A. Afanasyev, C. Yi, L. Wang, B. Zhang and L. Zhang, "SNAMP: Secure namespace mapping to scale NDN forwarding," 2015 IEEE Conference on Computer Communications Workshops (INFOCOM WKSHPS), 2015, pp. 281-286, doi: 10.1109/INFCOMW.2015.7179398. (Year: 2015).*

(Continued)

*Primary Examiner* — Khoa D Doan
(74) *Attorney, Agent, or Firm* — Greenberg Traurig

(57) ABSTRACT

A computer storage device having: a host interface; a controller; non-volatile storage media; and firmware. The firmware instructs the controller to: divide a contiguous logical address capacity into blocks according to a predetermined block size; and maintain a data structure to identify free blocks are available for allocation to new namespaces and blocks that have been allocated to namespaces in use. Based on the content of the data structure, non-contiguous blocks can be allocated to a namespace; and logical addresses in the namespace can be translated to physical addresses for addressing the non-volatile storage media of the storage device.

20 Claims, 4 Drawing Sheets

(56) References Cited

U.S. PATENT DOCUMENTS

| | | | |
|---|---|---|---|
| 8,738,621 B2 | 5/2014 | Hinrichs | |
| 8,862,590 B2 | 10/2014 | Sheehan | |
| 9,116,904 B2 | 8/2015 | Christiansen et al. | |
| 9,430,480 B1 | 8/2016 | Bono | |
| 9,501,392 B1 | 11/2016 | Weingarten | |
| 9,529,735 B2 * | 12/2016 | Hashimoto | H04L 9/0816 |
| 10,223,254 B1 | 3/2019 | Frolikov | |
| 10,437,476 B2 | 10/2019 | Frolikov | |
| 10,503,404 B2 | 12/2019 | Frolikov | |
| 10,642,488 B2 | 5/2020 | Frolikov | |
| 10,678,703 B2 | 6/2020 | Frolikov | |
| 10,915,440 B2 | 2/2021 | Frolikov | |
| 10,969,963 B2 | 4/2021 | Frolikov | |
| 11,003,576 B2 | 5/2021 | Frolikov | |
| 11,157,173 B2 | 10/2021 | Frolikov | |
| 2004/0236924 A1 | 11/2004 | Johnson et al. | |
| 2005/0108269 A1 | 5/2005 | Szajdecki et al. | |
| 2006/0020745 A1 | 1/2006 | Conley et al. | |
| 2008/0109662 A1 | 5/2008 | Natarajan et al. | |
| 2009/0007162 A1 | 1/2009 | Sheehan | |
| 2009/0092252 A1 | 4/2009 | Noll et al. | |
| 2009/0198899 A1 | 8/2009 | Revanuru | |
| 2010/0036889 A1 | 2/2010 | Joshi et al. | |
| 2010/0095057 A1 | 4/2010 | Li et al. | |
| 2010/0191779 A1 | 7/2010 | Hinrichs | |
| 2010/0262583 A1 | 10/2010 | van Ingen et al. | |
| 2010/0268872 A1 | 10/2010 | Lee et al. | |
| 2010/0318760 A1 | 12/2010 | So et al. | |
| 2011/0022566 A1 | 1/2011 | Beaverson et al. | |
| 2011/0106771 A1 | 5/2011 | McDonald et al. | |
| 2012/0272037 A1 | 10/2012 | Bayer et al. | |
| 2013/0080732 A1 | 3/2013 | Nellans et al. | |
| 2014/0280392 A1 | 9/2014 | Christiansen et al. | |
| 2014/0281040 A1 | 9/2014 | Liu | |
| 2014/0310499 A1 | 10/2014 | Sundararaman et al. | |
| 2015/0012538 A1 | 1/2015 | Sheehan | |
| 2015/0193159 A1 * | 7/2015 | Jo | G06F 3/0623 711/103 |
| 2015/0242309 A1 | 8/2015 | Talagala et al. | |
| 2015/0278397 A1 | 10/2015 | Hendrickson et al. | |
| 2015/0319243 A1 | 11/2015 | Hussain et al. | |
| 2016/0062885 A1 | 3/2016 | Ryu | |
| 2016/0124843 A1 | 5/2016 | Kanno | |
| 2016/0283125 A1 | 9/2016 | Hashimoto et al. | |
| 2016/0342463 A1 | 11/2016 | Oshima | |
| 2017/0024137 A1 | 1/2017 | Kanno | |
| 2017/0149924 A1 | 5/2017 | Peterson et al. | |
| 2017/0242617 A1 | 8/2017 | Walsh et al. | |
| 2017/0262175 A1 | 9/2017 | Kanno | |
| 2017/0344430 A1 | 11/2017 | Greer et al. | |
| 2017/0351431 A1 | 12/2017 | Dewitt et al. | |
| 2018/0018917 A1 | 1/2018 | Yoo et al. | |
| 2018/0024920 A1 | 1/2018 | Thomas et al. | |
| 2018/0088805 A1 | 3/2018 | Kanno | |
| 2018/0088811 A1 | 3/2018 | Kanno | |
| 2018/0089101 A1 | 3/2018 | Sternberg et al. | |
| 2018/0121344 A1 * | 5/2018 | Seo | G06F 12/0246 |
| 2018/0239697 A1 | 8/2018 | Huang et al. | |
| 2018/0260319 A1 | 9/2018 | Thompson et al. | |
| 2018/0260334 A1 | 9/2018 | Asano et al. | |
| 2018/0275871 A1 | 9/2018 | Ptak | |
| 2018/0275873 A1 | 9/2018 | Frid et al. | |
| 2019/0121543 A1 | 4/2019 | Frolikov | |
| 2019/0121547 A1 | 4/2019 | Frolikov | |
| 2019/0121548 A1 | 4/2019 | Frolikov | |
| 2019/0146907 A1 | 5/2019 | Frolikov | |
| 2019/0146912 A1 | 5/2019 | Frolikov | |
| 2019/0146927 A1 | 5/2019 | Frolikov | |
| 2019/0146931 A1 | 5/2019 | Frolikov | |
| 2019/0347010 A1 | 11/2019 | Frolikov | |
| 2019/0361610 A1 | 11/2019 | Frolikov | |
| 2020/0257449 A1 | 8/2020 | Frolikov | |
| 2020/0278933 A1 | 9/2020 | Frolikov | |
| 2021/0165737 A1 | 6/2021 | Frolikov | |
| 2021/0181950 A1 | 6/2021 | Frolikov | |
| 2021/0255952 A1 | 8/2021 | Frolikov | |

OTHER PUBLICATIONS

Dave Minturn, J. Metz, "Under the Hood with NVMe over Fabrics", Dec. 15, 2015.
Hermann Strass, "An Introduction to NVMe", copyrighted 2016.
International Search Report and Written Opinion, Int. App. No. PCT/US2018/056076, dated Jan. 30, 2019.
International Search Report and Written Optinion, Int. Pat. App. Ser. PCT/US2018/059377, dated Feb. 21, 2019.
J. Metz, Creating Higher Performance Solid State Storage with Non-Volatile Memory Express (NVMe), SNIA, Data Storage Innovation Conference, 2015.
Kevin Marks, "An NVM Express Tutorial", Flash Memory Summit 2013, created on Aug. 7, 2013.
NVM Express, Revision 1.2, Nov. 3, 2014.
Title: Namespace Management in Non-Volatile Memory Devices, U.S. Appl. No. 15/790,979, filed Oct. 23, 2017, Inventor: Alex Frolikov, Status: Patented Case, Status Date: Jun. 10, 2019.
Title: Namespace Management in Non-Volatile Memory, U.S. Appl. No. 16/535,728, filed Aug. 8, 2019, Inventor: Alex Frolikov, Status: Patented Case, Status Date: Jan. 4, 2021.
Title: Namespaces Allocation in Non-Volatile Memory Devices, U.S. Appl. No. 17/184,487, filed Feb. 24, 2021, Inventor: Alex Frolikov, Status: Docketed New Case—Ready for Examination, Status Date: Aug. 22, 2021.
Title: Namespace Encryption in Non-Volatile Memory Devices, U.S. Appl. No. 15/814,679, filed Nov. 16, 2017, Inventor: Alex Frolikov, Status: Response to Non-Final Office Action Entered and Forwarded to Examiner, Status Date: Oct. 20, 2021.
Title: Namespace Mapping Structural Adjustment in Non-Volatile Memory Devices, U.S. Appl. No. 17/569,434, filed Jan. 5, 2022, Inventor: Alex Frolikov, Status: Docketed New Case—Ready for Examination, Status Date: Jan. 18, 2022.

* cited by examiner

NAMESPACE MANAGEMENT IN NON-VOLATILE MEMORY DEVICES

RELATED APPLICATIONS

The present application is a continuation application of U.S. patent application Ser. No. 16/535,728 filed Aug. 8, 2019, and issued as U.S. Pat. No. 11,157,173 on Oct. 26, 2021, which is a continuation application of U.S. patent application Ser. No. 15/790,979 filed Oct. 23, 2017, and issued as U.S. Pat. No. 10,503,404 on Dec. 10, 2019, the entire disclosures of which applications are hereby incorporated herein by reference.

TECHNICAL FIELD

At least some embodiments disclosed herein relate to computer storage devices in general and more particularly, but not limited to namespace management in non-volatile storage devices.

BACKGROUND

Typical computer storage devices, such as hard disk drives (HDDs), solid state drives (SSDs), and hybrid drives, have controllers that receive data access requests from host computers and perform programmed computing tasks to implement the requests in ways that may be specific to the media and structure configured in the storage devices, such as rigid rotating disks coated with magnetic material in the hard disk drives, integrated circuits having memory cells in solid state drives, and both in hybrid drives.

A standardized logical device interface protocol allows a host computer to address a computer storage device in a way independent from the specific media implementation of the storage device.

For example, Non-Volatile Memory Host Controller Interface Specification (NVMHCI), also known as NVM Express (NVMe), specifies the logical device interface protocol for accessing non-volatile storage devices via a Peripheral Component Interconnect Express (PCI Express or PCIe) bus.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
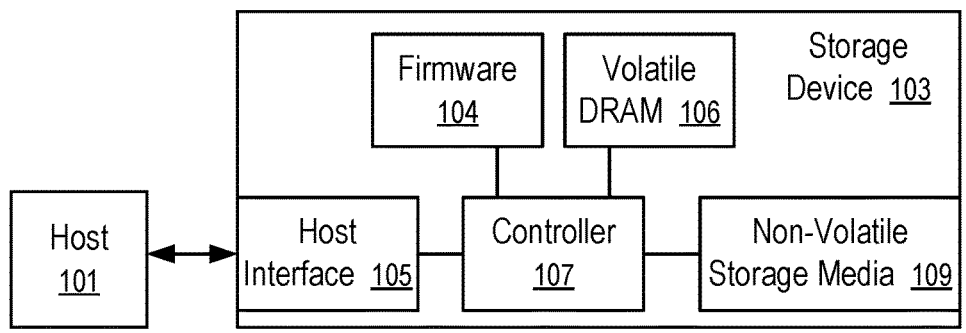
FIG. 1 shows a computer system in which embodiments of inventions disclosed herein can be implemented.

At least some embodiments disclosed herein provide efficient and flexible ways to implement logical storage allocations and management in storage devices.

Physical memory elements of a storage device can be arranged as logical memory blocks addressed via Logical Block Addressing (LBA). A logical memory block is the smallest LBA addressable memory unit; and each LBA address identifies a single logical memory block that can be mapped to a particular physical address of a memory unit in the storage device.

The concept of namespace for storage device is similar to the concept of partition in a hard disk drive for creating logical storages. Different portions of a storage device can be allocated to different namespaces and thus can have LBA addresses configured independently from each other within their respective namespaces. Each namespace identifies a quantity of memory of the storage device addressable via LBA. A same LBA address can be used in different namespaces to identify different memory units in different portions of the storage device. For example, a first namespace allocated on a first portion of the storage device having n memory units can have LBA addresses ranging from 0 to n−1; and a second namespace allocated on a second portion of the storage device having m memory units can have LBA addresses ranging from 0 to m−1.

A host computer of the storage device may send a request to the storage device for the creation, deletion, or reservation of a namespace. After a portion of the storage capacity of the storage device is allocated to a namespace, an LBA address in the respective namespace logically represents a particular memory unit in the storage media, although the particular memory unit logically represented by the LBA address in the namespace may physically correspond to different memory units at different time instances (e.g., as in SSDs).

There are challenges in efficiently implementing the mapping of LBA addresses defined in multiple namespaces into physical memory elements in the storage device and in efficiently using the storage capacity of the storage device, especially when it is desirable to dynamically allocate, delete and further allocate on the storage device multiple namespaces with different, varying sizes. For example, the portion of the storage capacity allocated to a deleted namespace may not be sufficient to accommodate the allocation of a subsequent namespace that has a size larger than the deleted namespace; and repeated cycles of allocation and deletion may lead to fragmentation of the storage capacity that may lead to inefficient mapping of LBA addresses to physical addresses and/or inefficient usage of the fragmented storage capacity of the storage device.

At least some embodiments of the inventions disclosed herein address the challenges through a block by block map from LBA addresses defined in allocated namespaces to LBA addresses defined on the entire storage capacity of the storage device. After mapping the LBA addresses defined in allocated namespaces into the LBA addresses defined on the entire storage capacity of the storage device, the corresponding LBA addresses defined on the entire storage capacity of the storage device can be further mapped to the physical storage elements in a way independent of the allocations of namespaces on the device. When the block by block mapping of LBA addresses is based on a predetermined size block size, an efficient data structure can be used for the efficient computation of LBA addresses defined on the entire storage capacity of the storage device from the LBA addresses defined in the allocated namespaces.

For example, the entire storage capacity of the storage device can be divided into blocks of LBA addresses according to a predetermined block size for flexibility and efficiency in namespace management. The block size represents the number of LBA addresses in a block. A block of the predetermined block size may be referred to hereafter as an L-block, a full L-block, a full LBA block, an LBA block, or sometimes simply as a full block or a block. The block by block namespace mapping from LBA addresses defined in allocated namespaces to LBA addresses defined on the entire storage capacity of the storage device allows the allocation of non-contiguous LBA addresses defined on the entire storage to a namespace, which can reduce fragmentation of the storage capacity caused by cycles of namespace allocation and deletion and improve efficiency in the usage of the storage capacity.

Preferably, the block size of L-blocks is predetermined and is a power of two (2) to simplify computations involved in mapping of addresses for the L-blocks. In other instances, an optimized block size may be predicted or calculated, using an artificial intelligence technique, through machine learning from the namespace usage histories in the storage device and/or other similarly used storage devices.

FIG. 1 shows a computer system in which embodiments of inventions disclosed herein can be implemented.

In FIG. 1, a host (101) communicates with a storage device (103) via a communication channel having a predetermined protocol. The host (101) can be a computer having one or more Central Processing Units (CPUs) to which computer peripheral devices, such as the storage device (103), may be attached via an interconnect, such as a computer bus (e.g., Peripheral Component Interconnect (PCI), PCI eXtended (PCI-X), PCI Express (PCIe)), a communication portion, and/or a computer network.

The computer storage device (103) can be used to store data for the host (101). Examples of computer storage devices in general include hard disk drives (HDDs), solid state drives (SSDs), flash memory, dynamic random-access memory, magnetic tapes, network attached storage device, etc. The storage device (103) has a host interface (105) that implements communications with the host (101) using the communication channel. For example, the communication channel between the host (101) and the storage device (103) is a PCIe bus in one embodiment; and the host (101) and the storage device (103) communicate with each other using NVMe protocol.

In some implementations, the communication channel between the host (101) and the storage device (103) includes a computer network, such as a local area network, a wireless local area network, a wireless personal area network, a cellular communications network, a broadband high-speed always-connected wireless communication connection (e.g., a current or future generation of mobile network link); and the host (101) and the storage device (103) can be configured to communicate with each other using data storage management and usage commands similar to those in NVMe protocol.

The storage device (103) has a controller (107) that runs firmware (104) to perform operations responsive to the communications from the host (101). Firmware in general is a type of computer program that provides control, monitoring and data manipulation of engineered computing devices. In FIG. 1, the firmware (104) controls the operations of the controller (107) in operating the storage device (103), such as the allocation of namespaces for storing and accessing data in the storage device (103), as further discussed below.

The storage device (103) has non-volatile storage media (109), such as magnetic material coated on rigid disks, and memory cells in an integrated circuit. The storage media (109) is non-volatile in that no power is required to maintain the data/information stored in the non-volatile storage media (109), which data/information can be retrieved after the non-volatile storage media (109) is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media (109) is non-volatile and can retain data stored therein without power for days, months, and/or years.

The storage device (103) includes volatile Dynamic Random-Access Memory (DRAM) (106) for the storage of run-time data and instructions used by the controller (107) to improve the computation performance of the controller (107) and/or provide buffers for data transferred between the host (101) and the non-volatile storage media (109). DRAM (106) is volatile in that it requires power to maintain the data/information stored therein, which data/information is lost immediately or rapidly when the power is interrupted.

Volatile DRAM (106) typically has less latency than non-volatile storage media (109), but loses its data quickly when power is removed. Thus, it is advantageous to use the volatile DRAM (106) to temporarily store instructions and data used for the controller (107) in its current computing task to improve performance. In some instances, the volatile DRAM (106) is replaced with volatile Static Random-Access Memory (SRAM) that uses less power than DRAM in some applications. When the non-volatile storage media (109) has data access performance (e.g., in latency, read/write speed) comparable to volatile DRAM (106), the volatile DRAM (106) can be eliminated; and the controller (107) can perform computing by operating on the non-volatile storage media (109) for instructions and data instead of operating on the volatile DRAM (106).

For example, cross point storage and memory devices (e.g., 3D XPoint memory) have data access performance comparable to volatile DRAM (106). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors, each having its own in-processor cache memory.

Optionally, the controller (107) performs data intensive, in-memory processing using data and/or instructions organized in the storage device (103). For example, in response to a request from the host (101), the controller (107) performs a real time analysis of a set of data stored in the storage device (103) and communicates a reduced data set to the host (101) as a response. For example, in some applications, the storage device (103) is connected to real time sensors to store sensor inputs; and the processors of the controller (107) are configured to perform machine learning and/or pattern recognition based on the sensor inputs to support an artificial intelligence (AI) system that is implemented at least in part via the storage device (103) and/or the host (101).

In some implementations, the processors of the controller (107) are integrated with memory (e.g., 106 or 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

The storage device (103) can be used in various computing systems, such as a cloud computing system, an edge computing system, a fog computing system, and/or a standalone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

At least some embodiments of the inventions disclosed herein can be implemented using computer instructions executed by the controller (107), such as the firmware (104). In some instances, hardware circuits can be used to implement at least some of the functions of the firmware (104). The firmware (104) can be initially stored in the non-volatile storage media (109), or another non-volatile device, and loaded into the volatile DRAM (106) and/or the in-processor cache memory for execution by the controller (107).

For example, the firmware (104) can be configured to use the techniques discussed below in managing namespaces. However, the techniques discussed below are not limited to being used in the computer system of FIG. 1 and/or the examples discussed above.

Figure 2:
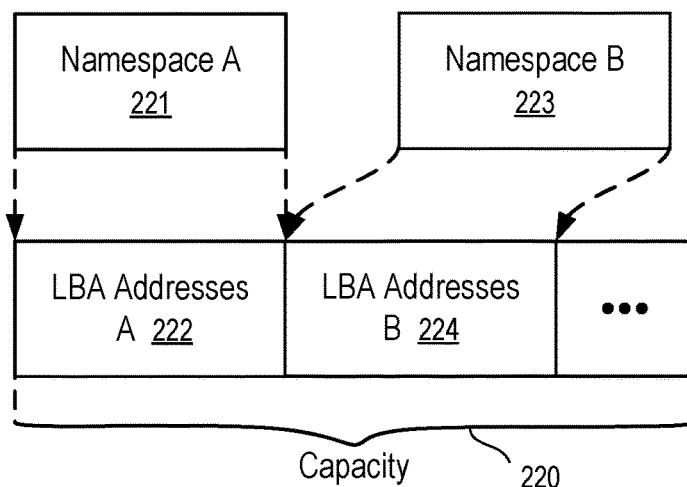
FIG. 2 illustrates an example of allocating multiple namespaces directly according to the requested sizes of the namespaces.

FIG. 2 illustrates an example of allocating multiple namespaces directly according to the requested sizes of the namespaces.

For example, the method of FIG. 2 can be implemented in the storage device (103) illustrated in FIG. 1. The non-volatile storage media (109) of the storage device (103) has memory units that may be identified by a range of LBA addresses (222, 224, . . . ), where the range corresponds to a memory capacity (220) of the non-volatile storage media (109).

In FIG. 2, namespaces (221, 223) are allocated directly from the contiguous, available region of the capacity (220). When one of the previously allocated namespaces (221, 223) is deleted, the remaining capacity (220), free for allocation to another namespace, may become fragmented, which limits the options for the selection of the size of a subsequent new namespace.

For example, when the namespace (221) illustrated in FIG. 2 is deleted and the namespace (223) remains to be allocated in a region as illustrated in FIG. 2, the free portions of the capacity (220) are fragmented, limiting the choices of the size of the subsequent new namespace to be the same as, or smaller than, the size of the namespace (221).

To improve the flexibility for dynamic namespace management and support iterations of creation and deletion of namespaces of different sizes, a block-wise mapping/allocation of logical addresses can be used, as further discussed below.

Figure 3:
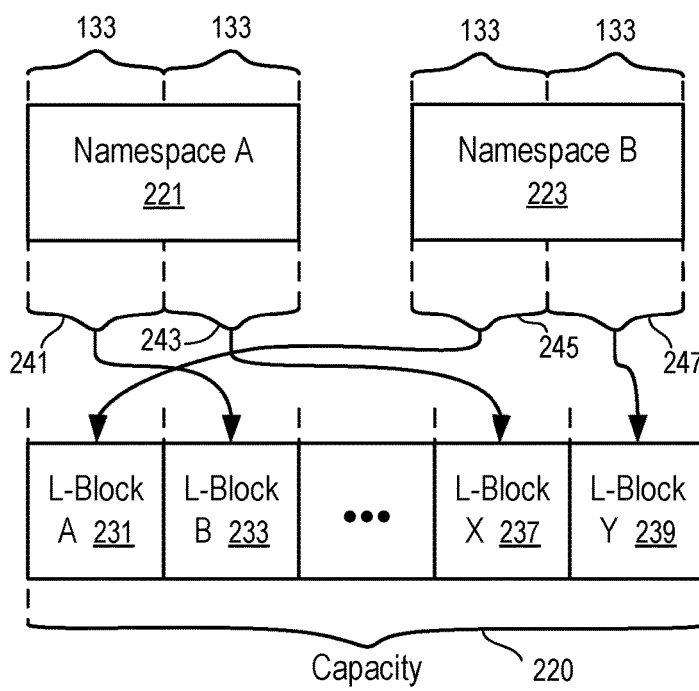
FIG. 3 illustrates an example of allocating namespaces via mapping blocks of logical addresses.

FIG. 3 illustrates an example of allocating namespaces via mapping blocks of logical addresses.

In FIG. 3, the capacity (220) of the storage device (103) is divided into L-blocks, or blocks (231, 233, . . . , 237, 239) of LBA addresses that are defined on the entire capacity of the storage device (103). To improve efficiency in address mapping, the L-blocks (231, 233, . . . , 237, 239) are designed to have the same size (133). Preferably, the block size (133) is a power of two (2), such that operations of division, modulo, and multiplication involving the block size (133) can be efficiently performed via shift operations.

After the capacity (220) is divided into L-blocks (231, 233, . . . , 237, 239) illustrated in FIG. 3, the allocation of a namespace (e.g., 221 or 223) does not have to be from a contiguous region of the capacity (220). A set of L-blocks (231, 233, . . . , 237, 239) from non-contiguous regions of the capacity (220) can be allocated from a namespace (e.g., 221 or 223). Thus, the impact of fragmentation on the size availability in creating new namespaces, which impact may result from the deletion of selected previously-created namespaces, is eliminated or reduced.

For example, non-contiguous L-blocks (233 and 237) in the capacity (220) can be allocated to contiguous regions (241 and 243) of the namespace (221) through block-wise mapping; and non-contiguous L-blocks (231 and 239) in the capacity (220) can be allocated to contiguous regions (245 and 247) of the namespace (223) via block-wise mapping.

When the block size (133) is reduced, the flexibility of the system in dynamic namespace management increases. However, a reduced block size (133) also increases the number of blocks to be mapped, which decreases the computation efficiency in address mapping. An optimal block size (133) balances the tradeoff between flexibility and efficiency; and a particular block size (133) can be selected for the specific usage of a given storage device (103) in a specific computing environment.

Figure 4:
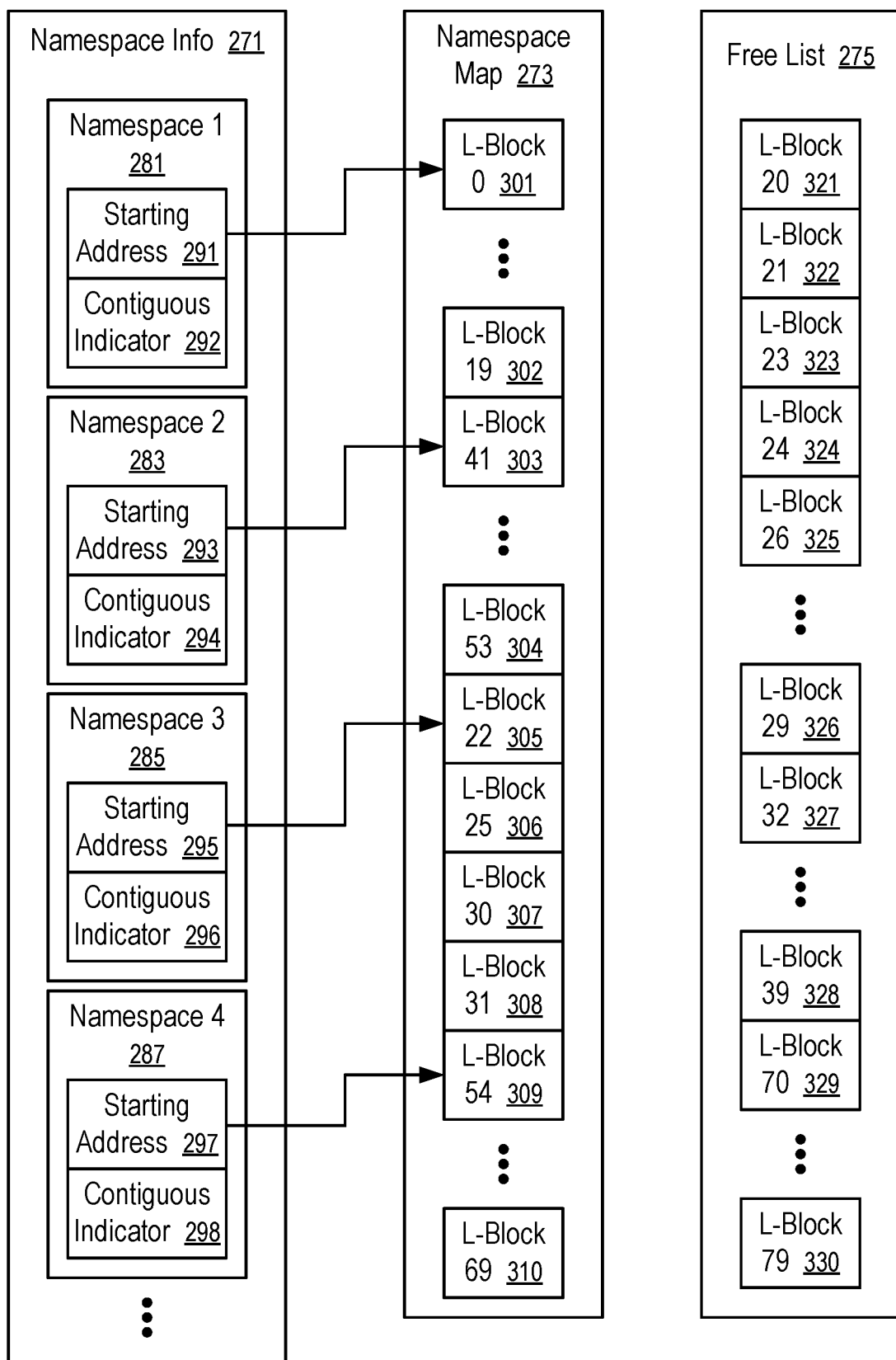
FIG. 4 illustrates an example of data structures for namespace mapping.

FIG. 4 illustrates an example of data structures for namespace mapping.

For example, the data structures for namespace mapping of FIG. 4 can be used to implement the block-wise address mapping illustrated in FIG. 3. The data structure of FIG. 4 is lean in memory footprint and optimal in computational efficiency.

In FIG. 4, a namespace map (273) stores an array of the identifications of L-blocks (e.g., 231, 233, . . . , 237, 239) that have been allocated to a set of namespaces (e.g., 221, 223) identified in namespace info (271).

In the array of the namespace map (273), the identifications of L-blocks (301, . . . , 302; 303, . . . , 304; 305, . . . 308; or 309, . . . , 310) allocated for each namespace (281, 283, 285, or 287) are stored in a contiguous region of the array. Thus, the portions of identifications of L-blocks (301, . . . , 302; 303, . . . , 304; 305, . . . 308; and 309, . . . , 310) allocated for different namespaces (281, 283, 285, and 287) can be told apart from the identification of the starting addresses (291, 293, 295, and 297) of the block identifications in the array.

Optionally, for each of the namespaces (281, 283, 285, or 287), the namespace info (271) identifies whether or not the L-blocks (301, . . . , 302; 303, . . . , 304; 305, . . . 308; or 309, . . . , 310) allocated for the respective namespaces (281, 283, 285, or 287) is contiguous on the logical addresses in the capacity (220).

For example, when the capacity (220) is divided into 80 blocks, the L-blocks may be identified as L-blocks 0 through 79. Since contiguous blocks 0 through 19 (301 and 302) are allocated for namespace 1 (281), the contiguous indicator (292) of the namespace 1 (281) has a value indicating that the sequence of L-blocks, identified via the block identifiers starting at a starting address (291) in the array of the namespace map (273), occupy a contiguous region in the logical address space/capacity (220).

Similarly, L-blocks 41 through 53 (303 and 304) allocated for namespace 2 (283) are contiguous; and thus, a contiguous indicator (294) of the namespace 2 (283) has the value indicating that the list of L-blocks, identified via the block identifiers starting at a starting address (293) in the array of the namespace map (273), are in a contiguous region in the logical address space/capacity (220).

Similarly, L-blocks 54 through 69 (309 and 310) allocated for namespace 4 (287) are contiguous; and thus, a contiguous indicator (298) of the namespace 4 (287) has the value indicating that the list of blocks, identified via the block identifiers starting at a starting address (297) in the array of the namespace map (273) occupies a contiguous region in the logical address capacity (220). It is preferable, but not required, that the L-blocks allocated for a namespace are in a contiguous region in the mapped logical address space/capacity (220).

FIG. 4 illustrates that blocks 22, 25, 30 and 31 (305, 306, 307 and 308) allocated for namespace 3 (285) are non-contiguous; and a contiguous indicator (296) of the namespace 3 (285) has a value indicating that the list of blocks, identified via the block identifiers starting at a starting address (295) in the array of in the namespace map (273), is allocated from a non-contiguous regions in the mapped logical address space/capacity (220).

In some instances, a storage device (103) can allocate up to a predetermined number of namespaces. Null addresses can be used as starting addresses of namespaces that have not yet been allocated. Thus, the namespace info (271) has a predetermined data size that is a function of the predetermined number of namespaces allowed to be allocated on the storage device (103).

Optionally, the data structure includes a free list (275) that has an array storing the identifiers of L-blocks (321-325, . . . , 326-327, . . . , 328-329, . . . , 330) that have not yet been allocated to any of the allocated namespaces (281, 283, 285, 287) identified in the namespace info (271).

In some instances, the list of identifiers of L-blocks (321-330) in the free list (275) is appended to the end of the list of identifiers of L-blocks (301-310) that are currently allocated to the namespaces (281, 283, 285, 287) identified in the namespace info (271). A free block starting address field can be added to the namespace info (271) to identify the beginning of the list of identifiers of the L-blocks (321-330) that are in the free list (275). Thus, the namespace map (273) has an array of a predetermined size corresponding to the total number of L-blocks on the capacity (220).

Figure 5:
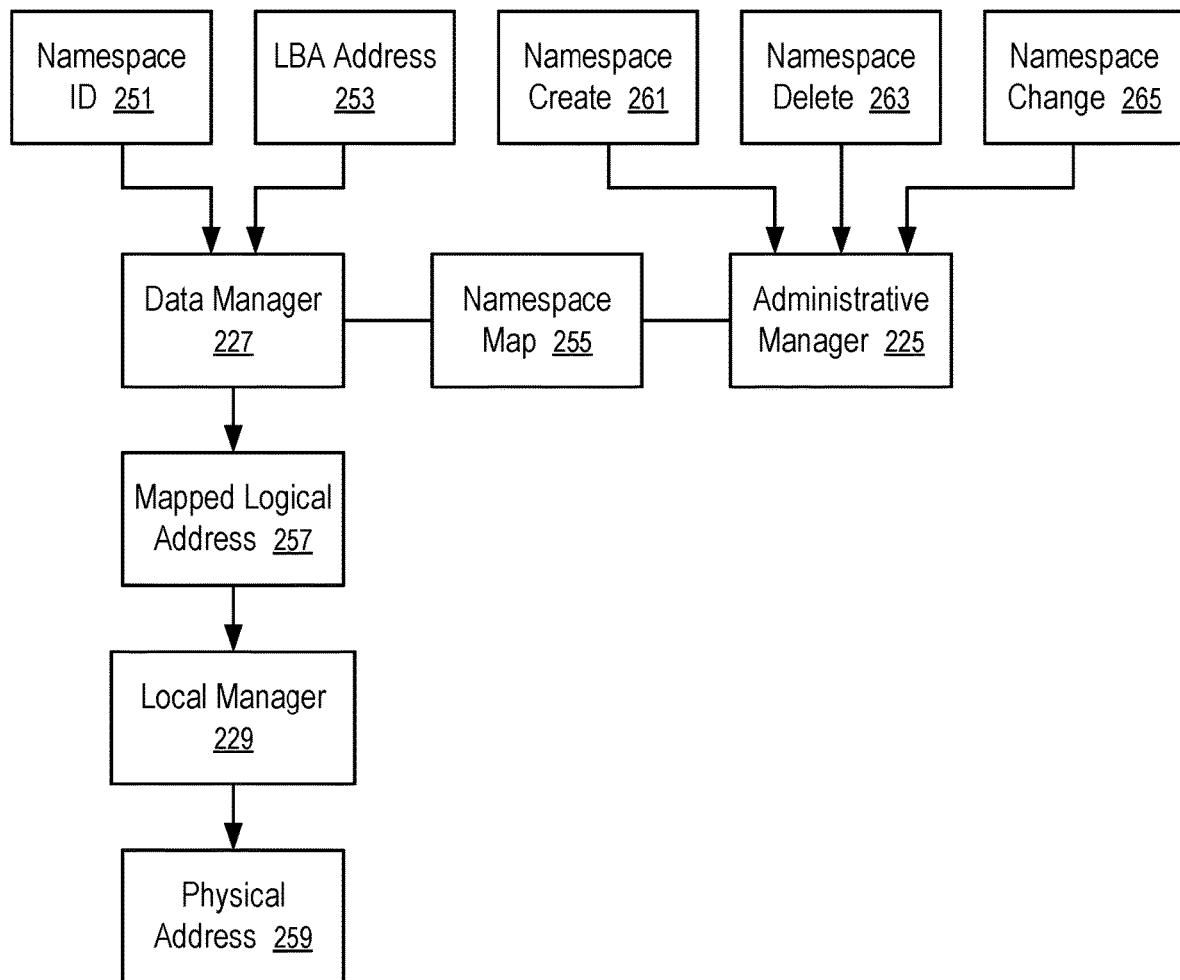
FIG. 5 shows a system to translate addresses in a non-volatile memory device to support namespace management.

FIG. 5 shows a system to translate addresses in a non-volatile memory device to support namespace management. For example, the system of FIG. 5 can be implemented using a storage device (103) illustrated in FIG. 1, a logical address mapping technique illustrated in FIG. 3, and a data structure similar to that illustrated in FIG. 4.

In FIG. 5, an administrative manager (225), a data manager (227) (or referred to as an I/O manager), and a local manager (229) are implemented as part of the firmware (e.g., 104) of a storage device (e.g., 103 illustrated in FIG. 1).

The administrative manager (225) receives commands (e.g., 261, 263, 265) from the host (e.g., 101 in FIG. 1) to create (261), delete (263), or change (265) a namespace (e.g., 221 or 223). In response, the administrative manager (225) generates/updates a namespace map (255), such as the namespace map (273) to implement the mapping illustrated in FIG. 2 or 9. A namespace (e.g., 221 or 223) may be changed to expand or shrink its size (e.g., by allocating more blocks for the namespace, or returning some of its blocks to the pool of free blocks).

The data manager (227) receives data access commands. A data access request (e.g., read, write) from the host (e.g., 101 in FIG. 1) identifies a namespace ID (251) and an LBA address (253) in the namespace ID (251) to read, write, or erase data from a memory unit identified by the namespace ID (251) and the LBA address (253). Using the namespace map (255), the data manager (227) converts the combination of the namespace ID (251) and the LBA address (253) to a mapped logical address (257) in the corresponding L-block (e.g., 231, 233, . . . , 237, 239).

The local manager (229) translates the mapped logical address (257) to a physical address (259). The logical addresses in the L-block (e.g., 231, 233, . . . , 237, 239) can be mapped to the physical addresses (259) in the storage media (e.g., 109 in FIG. 1), as if the mapped logical addresses (257) were virtually allocated to a virtual namespace that covers the entire non-volatile storage media (109).

Thus, the namespace map (255) can be seen to function as a block-wise map of logical addresses defined in a current set of namespaces (221, 223) created/allocated on the storage device (103) to the mapped logical addresses (257) defined on the virtual namespace. Since the virtual namespace does not change when the current allocation of the current set of namespaces (221, 223) changes, the details of the current namespaces (221, 223) are completely shielded from the local manager (229) in translating the mapped logical addresses (e.g., 257) to physical addresses (e.g., 259).

Preferably, the implementation of the namespace map (255) is lean in memory footprint and optimal in computational efficiency (e.g., using a data structure like the one illustrated in FIG. 4).

In some instances, the storage device (103) may not have a storage capacity (220) that is a multiple of a desirable block size (133). Further, a requested namespace size may not be a multiple of the desirable block size (133). The administrative manager (225) may detect the misalignment of the desirable block size (133) with the storage capacity (220) and/or the misalignment of a requested namespace size with the desirable block size (133), causing a user to adjust the desirable block size (133) and/or the requested namespace size. Alternatively or in combination, the administrative manager (225) may allocate a full block to a portion of a misaligned namespace and/or not use a remaining part of the allocated full block.

Figure 6:
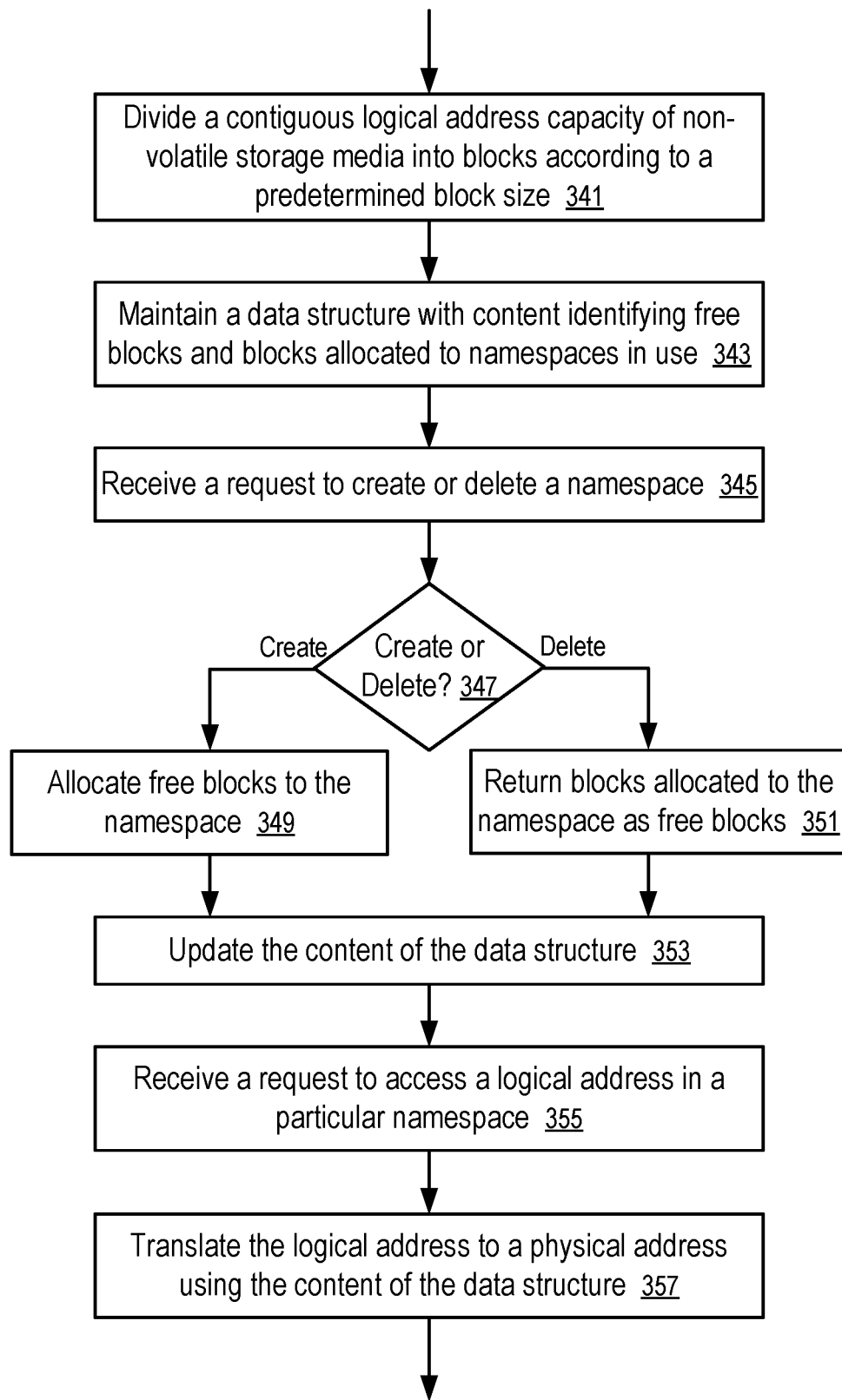
FIG. 6 shows a method to manage namespaces based on blocks of logical addresses.

FIG. 6 shows a method to manage namespaces based on blocks of logical addresses. For example, the method of FIG. 6 can be implemented in a storage device (103) illustrated in FIG. 1 using L-block techniques discussed above in connection with FIGS. 3-6.

In FIG. 6, the method includes: dividing (341) a contiguous logical address capacity (220) of non-volatile storage media (e.g., 109) into blocks (e.g., 231, 233, . . . , 237, 239) according to a predetermined block size (133) and maintaining (343) a data structure (e.g., illustrated in FIG. 4) with content identifying free blocks (e.g., 321-330) and blocks (e.g., 301-310) allocated to namespaces (281-285) in use.

In response to receiving (345) a request that is determined (347) to create a new namespace, the method further includes allocating (349) a number of free blocks to the namespace.

In response to receiving (345) a request that is determined (347) to delete an existing namespace, the method further includes returning (351) the blocks previously allocated to the namespace to the free block list (275) as free blocks.

In response to the request to create or delete a namespace, the method further includes updating (353) the content of the data structure to identify the currently available free blocks (e.g., 321-330) and blocks (e.g., 301-310) allocated to currently existing namespaces (281-285).

In response to receiving (355) a request to access a logical address in a particular namespace, the method further includes translating (357) the logical address to a physical address using the content of the data structure.

For example, a storage device (103) illustrated in FIG. 1 has: a host interface (105); a controller (107); non-volatile storage media (109); and firmware (104) containing instructions which, when executed by the controller (107), instruct the controller (107) to at least: store a block size (133) of logical addresses; divide a logical address capacity (220) of the non-volatile storage media (109) into L-blocks (e.g., 231, 233, . . . , 237, 239) according to the block size (133); and maintain a data structure to identify: a free subset of the L-blocks that are available for allocation to new namespaces (e.g., L-blocks 321-330); and an allocated subset of the L-blocks that have been allocated to existing namespaces (e.g., L-blocks 301-310). Preferably, the block size (133) is a power of two.

For example, the computer storage device (103) may be a solid state drive that communicates with the host (101) in accordance with a Non-Volatile Memory Host Controller Interface Specification (NVMHCI) for namespace management and/or access.

After the host interface (105) receives a request from a host (101) to allocate a particular namespace (221) of a quantity of non-volatile memory, the controller (107), executing the firmware (104), allocates a set of blocks (233 and 237) from the free subset to the particular namespace (221) and updates the content of the data structure. The set of blocks (233 and 237) allocated to the particular namespace (221) do not have to be contiguous in the logical address capacity (220), which improves the flexibility for dynamic namespace management.

Using the content of the data structure, the controller (107) executing the firmware (104) translates logical addresses defined in the first namespace the mapped logical addresses (257) and then to physical addresses (259) for the non-volatile storage media (109).

After the host interface (105) receives a request from the host (101) to delete (263) a particular namespace (221), the controller (107), executing the firmware (104), updates the content of the data structure to return the set of blocks (233 and 237) allocated to the particular namespace (221) from the allocated subset (e.g., 273) in the data structure to the free subset (e.g., 275) in the data structure.

Preferably, the data structure includes an array of identifications of blocks (301-310) in the allocated subset and pointers (291, 293, 295, 297) to portions (301-302, 303-304, 305-308, 309-310) of the array containing corresponding sets of identifications of blocks (301-310) that are allocated to respective ones of the existing namespaces (281, 283, 285, 287).

Optionally, the data structure further includes a set of indicators (292, 294, 296, 298) for the respective ones of the existing namespaces (281, 283, 285, 287), where each of the indicators (292, 294, 296, 298) indicating whether or not a respective set of identifications of blocks (301-302, 303-304, 305-308, 209-310) allocated to a corresponding one of the existing namespaces (281, 283, 285, 287) is contiguous in the logical address capacity (220) or space.

Optionally, the data structure includes an array of identifications of free blocks (321-330) in the free subset.

The logical address capacity (220) does not have to be a multiple of the block size (133). When the logical address capacity (220) is not a multiple of the block size (133), an L-block (e.g., 239) that is insufficient to be a full-size block may be not used.

The quantity of non-volatile memory requested for the creation (261) of a namespace (e.g., 221) does not have to be a multiple of the block size (133). When the quantity is not a multiple of the block size (133), one of the full blocks allocated to the namespace may not be fully utilized.

A non-transitory computer storage medium can be used to store instructions of the firmware (104). When the instructions are executed by the controller (107) of the computer storage device (103), the instructions cause the controller (107) to perform a method discussed above.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A device, comprising:
   storage media;
   an interface;
   a controller coupled to the interface and the storage media, the controller configured to:
      store data representative of, in a first logical address space, storage locations of second logical address spaces, the data including an indication, for each respective logical address space in the second logical address spaces, of the respective logical address space is contiguous in the first logical address space;
      convert, using the data, a first logical address in the respective logical address space, received via the interface, to a second logical address in the first logical address space; and
      convert the second logical address to a physical address in the storage media in execution of a command associated with the first logical address.

2. The device of claim 1, wherein the respective logical address space in the second logical address spaces is a namespace defined on a capacity of the storage media.

3. The device of claim 2, wherein the capacity of the storage media is an entire storage capacity of the device.

4. The device of claim 3, wherein the storage locations are identified in the data based on a predefined size of logical address blocks in the first logical address space.

5. The device of claim 4, wherein the predefined size is a power of two.

6. The device of claim 5, wherein the controller is configured via instructions which, when executed by the controller, instruct the controller to perform operations.

7. The device of claim 5, wherein the controller is further configured to store the predefined size.

8. The device of claim 4, wherein the controller is further configured to, in response to a first command received in the interface to create a first namespace having a namespace size:
   allocate, according to the namespace size, a plurality of blocks of logical addresses in the first logical address space, each of the plurality of blocks having the predefined size;
   update the data to associate the plurality of blocks with the first namespace; and
   store an indication of whether the plurality of blocks are contiguous in the first logical address space.

9. The device of claim 8, wherein the controller is further configured to, in response to a second command received in the interface to delete the first namespace:
   update the data to disassociate the plurality of blocks with the first namespace; and
   identify, in a list, the plurality of blocks, wherein the list is representative of blocks of logical addresses in the first logical address space available for allocation in creation of a namespace.

10. The device of claim 9, wherein the namespace size is not a multiple of the predefined size.

11. The device of claim 10, wherein the device is a solid state drive; and the interface is configured to receive the first command in accordance with a specification for Non-Volatile Memory Host Controller Interface (NVMHCI).

12. A method, comprising:
   storing, in a device having storage media, data representative of, in a first logical address space, storage locations of second logical address spaces, the data including an indication, for each respective logical address space in the second logical address spaces, of the respective logical address space is contiguous in the first logical address space;
   converting, by a controller of the device using the data, a first logical address in the respective logical address space, received via an interface of the device, to a second logical address in the first logical address space; and converting, by the controller, the second logical address to a physical address in the storage media in execution of a command associated with the first logical address.

13. The method of claim 12, wherein the respective logical address space in the second logical address spaces is a namespace defined on a capacity of the storage media; the capacity of the storage media is an entire storage capacity of the device; and the storage locations are identified in the data based on a predefined size of logical address blocks in the first logical address space.

14. The method of claim 13, further comprising, in response to a first command received in the interface of the device and configured to request creation of a first namespace having a namespace size:

allocating, according to the namespace size, a plurality of blocks of logical addresses in the first logical address space, each of the plurality of blocks having the predefined size;

updating the data to associate the plurality of blocks with the first namespace; and storing an indication of whether the plurality of blocks are contiguous in the first logical address space.

15. The method of claim 14, further comprising, in response to a second command received in the interface of the device and configured to request deletion of the first namespace:

updating the data to disassociate the plurality of blocks with the first namespace; and identifying, in a list, the plurality of blocks, wherein the list is representative of blocks of logical addresses in the first logical address space available for allocation in creation of a namespace.

16. The method of claim 15, wherein the namespace size is not a multiple of the predefined size; the device is a solid state drive configured to receive the first command and the second command in accordance with a specification for Non-Volatile Memory Host Controller Interface (NVMHCI); and the predefined size is a power of two.

17. A non-transitory computer storage medium storing instructions which, when executed in a device, cause the device to perform a method, comprising:

storing, in the device having storage media, data representative of, in a first logical address space, storage locations of second logical address spaces, the data including an indication, for each respective logical address space in the second logical address spaces, of the respective logical address space is contiguous in the first logical address space;

converting, by a controller of the device using the data, a first logical address in the respective logical address space, received via an interface of the device, to a second logical address in the first logical address space; and converting, by the controller, the second logical address to a physical address in the storage media in execution of a command associated with the first logical address.

18. The non-transitory computer storage medium of claim 17, wherein the respective logical address space in the second logical address spaces is a namespace defined on a capacity of the storage media; the capacity of the storage media is an entire storage capacity of the device; the storage locations are identified in the data based on a predefined size of logical address blocks in the first logical address space; and the predefined size is a power of two.

19. The non-transitory computer storage medium of claim 18, further comprising, in response to a first command received in the interface of the device and configured to request creation of a first namespace having a namespace size:

allocating, according to the namespace size, a plurality of blocks of logical addresses in the first logical address space, each of the plurality of blocks having the predefined size;

updating the data to associate the plurality of blocks with the first namespace; and storing an indication of whether the plurality of blocks are contiguous in the first logical address space.

20. The non-transitory computer storage medium of claim 19, further comprising, in response to a second command received in the interface of the device and configured to request deletion of the first namespace:

updating the data to disassociate the plurality of blocks with the first namespace; and identifying, in a list, the plurality of blocks, wherein the list is representative of blocks of logical addresses in the first logical address space available for allocation in creation of a namespace.

* * * * *